United States Patent
Joseph

(10) Patent No.: US 7,255,033 B2
(45) Date of Patent: Aug. 14, 2007

(54) APPARATUS AND METHOD OF MAKING A COMPOUND-ANGLED ORIFICE IN A DISC FOR A FUEL INJECTOR

(75) Inventor: J. Michael Joseph, Newport News, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 118 days.

(21) Appl. No.: 10/849,444

(22) Filed: May 20, 2004

(65) Prior Publication Data

US 2005/0257364 A1 Nov. 24, 2005

(51) Int. Cl.
*B26F 1/00* (2006.01)
*B23C 1/12* (2006.01)

(52) U.S. Cl. ............... 83/684; 83/72; 83/76.1; 408/236; 409/157; 409/211; 409/216

(58) Field of Classification Search ........... 83/109, 83/72, 76.1, 76.6, 684; 409/167, 173, 172, 409/109, 211, 216, 199, 235, 157; 408/236
See application file for complete search history.

(56) References Cited

U.S. PATENT DOCUMENTS

| | | | |
|---|---|---|---|
| 1,991,285 A * | 2/1935 | Lindner | 408/88 |
| 2,042,720 A * | 6/1936 | Lindner | 408/88 |
| 3,998,127 A * | 12/1976 | Romeu | 409/225 |
| 4,332,147 A * | 6/1982 | Grech | 464/109 |
| 4,589,174 A * | 5/1986 | Allen | 29/33 R |
| 4,709,455 A * | 12/1987 | D'Andrea et al. | 29/40 |
| 5,727,296 A * | 3/1998 | Kobler | 29/27 C |
| 5,996,329 A * | 12/1999 | Cardenas | 29/48.5 R |
| 6,145,178 A * | 11/2000 | Green | 29/26 A |
| 6,357,094 B1 * | 3/2002 | Sugimoto | 29/27 C |
| 6,503,033 B1 * | 1/2003 | Kim et al. | 409/201 |
| 6,651,308 B2 * | 11/2003 | Oldani | 29/558 |
| 6,719,506 B2 * | 4/2004 | Chang et al. | 409/201 |
| 6,976,821 B2 * | 12/2005 | Zarske | 414/680 |
| 2001/0021338 A1 * | 9/2001 | Mitsuzono et al. | 409/201 |
| 2002/0002420 A1 * | 1/2002 | Hirai et al. | 700/187 |
| 2002/0137002 A1 * | 9/2002 | Bodenmiller | 433/51 |

* cited by examiner

*Primary Examiner*—Boyer D. Ashley
*Assistant Examiner*—Edward Landrum

(57) ABSTRACT

An apparatus and method for piercing a metering disc from a workpiece of a fuel injector. The metering disc includes first and second surfaces that extend substantially parallel to a base plane. The first and second surfaces are spaced along a longitudinal axis that extends orthogonal with respect to the base plane. The apparatus includes a piercing tool that extends along a tool axis, a planar coordinate positioning mechanism, and a spherical coordinate positioning mechanism. The piercing tool is adapted to penetrate the workpiece. The planar coordinate positioning mechanism displaces parallel to the longitudinal axis of the piercing tool relative to the workpiece. And the spherical coordinate positioning mechanism pivots about the tool axis relative at least one of three axes.

6 Claims, 4 Drawing Sheets

APPARATUS AND METHOD OF MAKING A COMPOUND-ANGLED ORIFICE IN A DISC FOR A FUEL INJECTOR

BACKGROUND OF THE INVENTION

It is believed that contemporary fuel injectors can be designed to accommodate a particular engine in part to meet tailpipe emission standards. The ability to meet stringent tailpipe emission standards for mass-produced automotive vehicles is at least in part attributable to the ability to assure consistency in both shaping and aiming the injection spray pattern or stream, e.g., toward intake valve(s) or into a combustion cylinder. In an attempt to further reduce emissions, wetting the wall of an intake manifold or combustion chamber should be avoided.

Because of the large number of different engine models that use multi-point fuel injectors, a large number of unique injectors are needed to provide the desired shaping and aiming of the injection spray or stream for each cylinder of an engine. To accommodate these demands, fuel injectors have heretofore been designed to produce a variety of spray patterns or streams, such as, straight streams, bent streams, split streams, and split/bent streams. In fuel injectors utilizing thin disc orifice members, the stream or spray pattern of fuel from the injection can be created solely by the specific design of the thin disc orifice member. This capability offers the opportunity for meaningful efficiency in manufacturing since other components of the fuel injector can be of a common design for multiple applications.

In manufacturing the thin disc orifice members, i.e., a metering orifice disc, it is believed that various processes are performed on a blank workpiece at discrete stages spaced apart in a progression of workstations. Each stage on the assembly line may require a different set up configuration, such as, for example, a different jig or tool for each metering orifice of the disc configuration. Where the manufacturing of the metering disc involves an orifice whose wall is oblique to its generally planar surface or a metering disc that requires a dimpled surface, the manufacturing of such metering discs is believed to require additional manufacturing steps as compared to a metering disc without a dimpled surface, and thereby is believed to be an inefficient process.

SUMMARY OF THE INVENTION

The present invention provides an apparatus for forming a metering disc of a fuel injector from a workpiece such that a single tooling unit performs various punching, stamping, dimpling operations on the workpiece. The metering disc includes first and second surfaces extending substantially parallel to a base plane along at least first and second platform axes. The first and second surfaces are spaced along a third platform axis extending orthogonally with respect to the base plane. The apparatus includes a piercing tool, a planar coordinate positioning mechanism, and a spherical coordinate positioning mechanism. The piercing tool extends along a tool axis, and adapted to penetrate the workpiece. The planar coordinate positioning mechanism is operable to displace the piercing tool parallel to at least the first platform axis relative to the workpiece. The spherical coordinate positioning mechanism is operable to pivot the tool axis relative to first, second and third axes so that a tip of the piercing tool is located on the base plane of the workpiece.

The present invention also provides a method of forming a metering disc of a fuel injector from a strip blank. The metering disc includes first and second surfaces that extend substantially parallel to a base plane. The first and second surfaces are spaced along a plate axis that extends orthogonal with respect to the base plane. The method includes feeding the strip blank into a forming apparatus along a first plate axis; positioning a piercing tool with respect to the strip blank along the first plate axis and a second plate axis, the piercing tool extending along a tool axis, the positioning including: translating the tool axis parallel to one of a first, second, and third axes relative to the strip blank; and pivoting the tool axis relative to at least one of the first, second and third axes by at least one respective angular magnitude; and penetrating the strip blank with the piercing tool, the penetrating including displacing the piercing tool or a suitable tool such as, for example a shaping or coining punch, along the tool axis.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT(S)

Figure 1A:
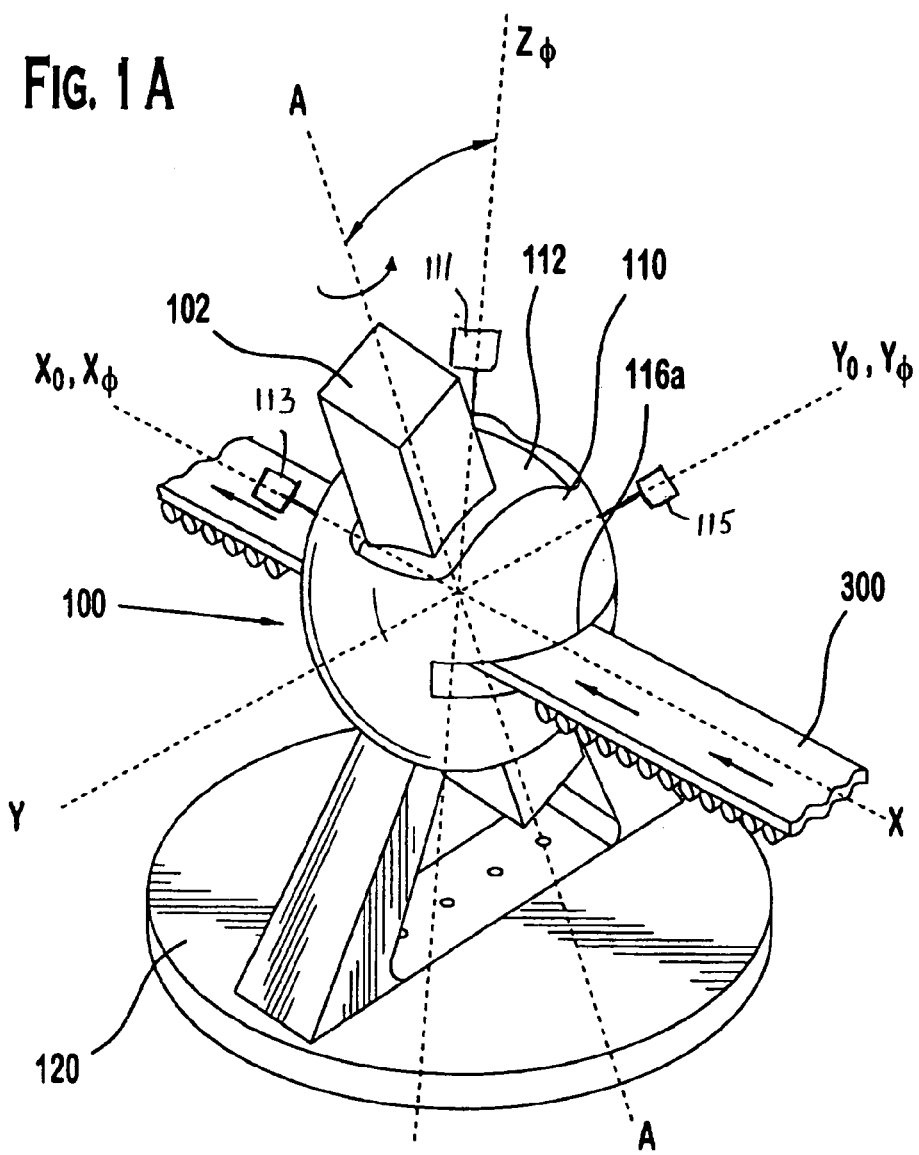
FIG. 1A is a perspective view of a preferred embodiment of the self-contained tooling unit.
Figure 1B:
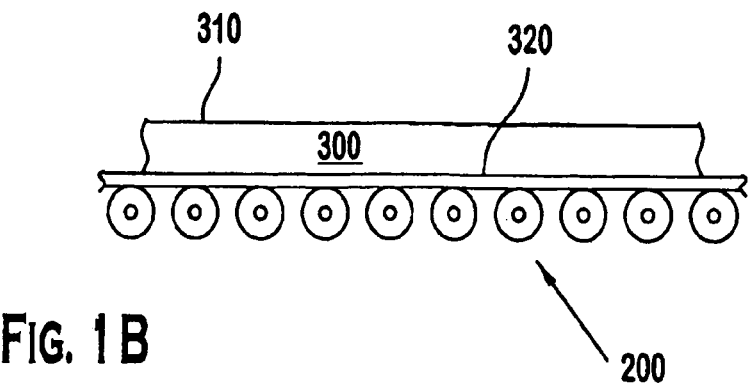
FIG. 1B is a side view of a material transport portion of the self-contained tooling unit.

FIGS. 1-4 illustrate the preferred embodiments. Referencing FIG. 1A, a self-contained tooling unit 100 is illustrated in conjunction with a material transporting apparatus 200 that transport a workpiece 300. Preferably, the transport apparatus 200 feeds a continuous strip of stainless steel plate for processing into a metering disc, which can be used in a fuel injector.

The self-contained tooling unit 100 includes a punching unit 102 coupled to a swivel bearing 112. The punching unit 102 with tool 130 can be positioned relative to the workpiece 300 by a combination of Cartesian and spherical coordinates. By using this combination of coordinates, a desired orifice configuration can be formed by a tool 130 regardless of a particular physical configuration of the workpiece 300 such as, for example, a flat, dimpled or facetted plate. That is, the combination of the coordinates in position the punching unit 102 can account for the geometry of the workpiece 300 in relation to its position so that the workpiece 300 can be held in a fixed position while a tool 130 is positioned accurately during the piercing of an orifice on the workpiece 300.

Figure 3:
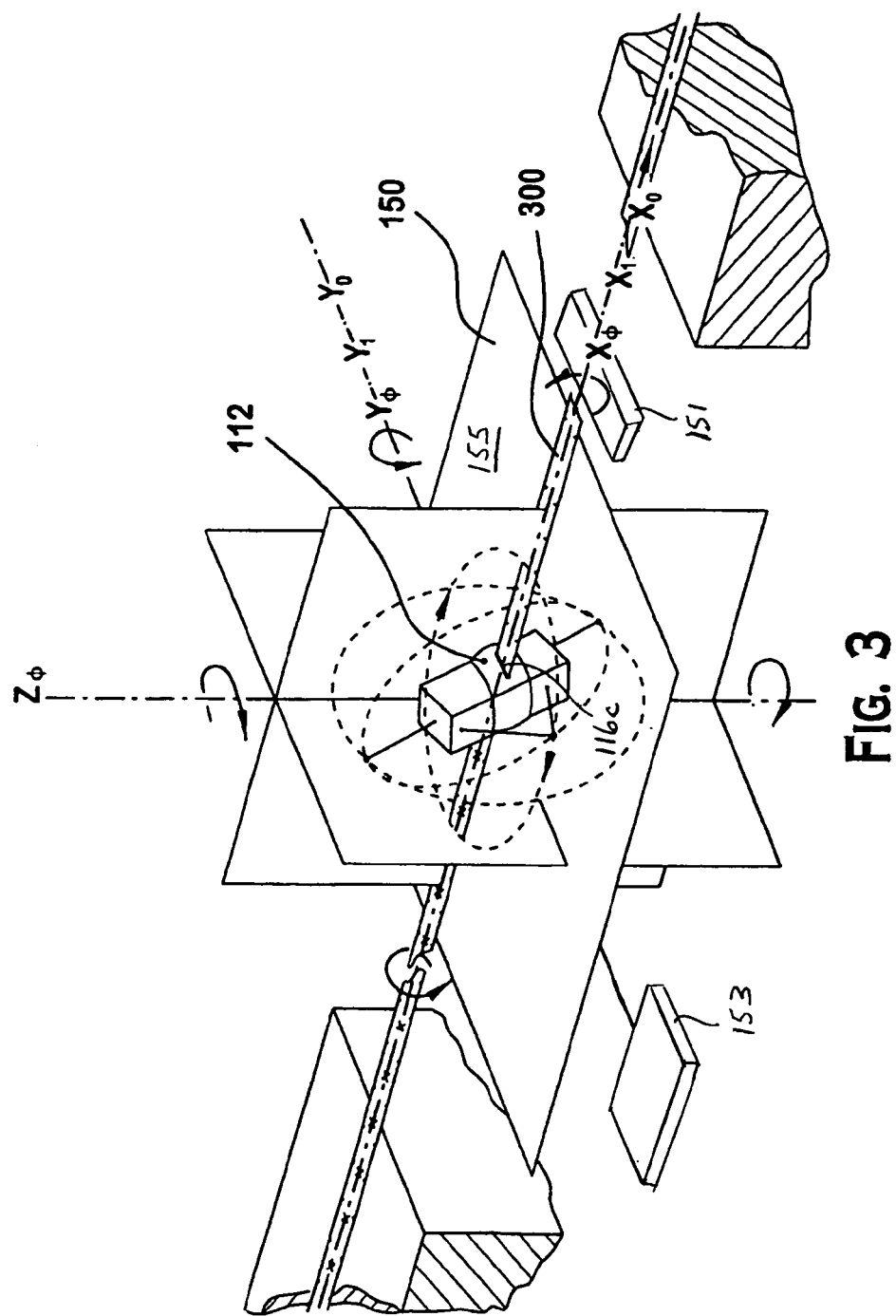
FIG. 3 is a perspective view of the self-contained tooling unit with referential datum provided therein.

The workpiece 300 includes a generally planar first surface 310 and generally planar second surface 320. The first and second surfaces 310, 320 can extend substantially parallel to a base plane 150 along axes Xo and Yo (FIG. 3). The first and second surfaces 310 and 320 can be spaced apart on an axis perpendicular to the base plane 150 over a distance of about 50 microns to 600 microns.

The workpiece 300 can be configured so that the workpiece 300 has a center located by a Cartesian coordinate defined by Xo and Yo of a platform 140 supporting the planar surface of the workpiece 300. Preferably, the workpiece is provided with a pilot aperture that defines the center Xo, Yo of the workpiece 300.

In positioning the tool 130 relative to the center Xo, Yo, there are two systems of coordinates for the tool 130: (1) a Cartesian coordinate to locate the center of the tooling unit 102 with respect to a reference point on the workpiece 300, and (2) a spherical coordinate to define the rotation of the tooling unit 102 in three-dimensional space relative to the reference point on the workpiece 300.

The cartesian coordinates are used to locate the tool 130 on the support platform 140 of the workpiece 300. Specifically, the center of the tooling unit 102 can be given a cartesian coordinate of $X_1$, $Y_1$, which has a finite distance from the center of each workpiece. The tooling unit 102 can be positioned so that the center of the tooling unit 102 as defined by $X_1$, $Y_1$ can be generally coincident with the center Xo, Yo of the center of each portion of the workpiece 300.

The spherical coordinates are used to locate the tool 130 on the support platform 140 relative to the center Xo, Yo so as to allow the tool 130 to form orifices that are oblique to the base plane 150. Specifically, the center of the tooling unit can be defined by spherical coordinates $Z_\varnothing$, $X_\varnothing$, and $Y_\varnothing$. The three referential spherical coordinate axes $Z_\varnothing$, $X_\varnothing$, and $Y_\varnothing$ are defined in relation to the center Xo, Yo of the workpiece 300: (1) a first axis $Z_\varnothing$ extending generally perpendicular to at least one of the first and second surfaces 310 and 320; (2) a second axis $X_\varnothing$ extending generally along a plane defined by the first surface and perpendicular to the first axis $Z_\varnothing$; and (3) a third axis $Y_\varnothing$ extending along the plane and orthogonal to the first and second axes $X_\varnothing$ and $Z_\varnothing$.

The referential axes $Z_\varnothing$, $X_\varnothing$, and $Y_\varnothing$ allow the center of the tool 130, which has a tool axis A-A to be determined in relation to the base plane 150 of the workpiece 300. Once the position of the tool axis A-A has been located with respect to the center Xo, Yo of the workpiece 300, the swivel bearing 112 can be used to position the tool at the center Xo, Yo or at any desired location on the workpiece. The swivel bearing 112 can be mounted in the gimbaled frame 110 on a platform 120 so that the punching unit 102 can rotate on the swivel bearing 112 about axis $Z_\varnothing$ extending generally perpendicular to the platform. Thus, by virtue of a positioning mechanism 155 and the swivel bearing 112, the tool 130 can translate along axes Xo and Yo while simultaneously pivoting about one or more of the axes $Z_\varnothing$, $X_\varnothing$, and $Y_\varnothing$.

The self-contained tooling unit 100 can include a suitable piercing tool (e.g., tool 130) extending along a tool axis A-A. The piercing tool can be a suitable tool used for penetrating the metering disc, such as, for example, a punch, drill, EDM punch, coining, dimpling, punch shaving or laser drilling machine. The piercing tool (e.g., tool 130) can be coupled to a planar coordinate positioning mechanism 155, which can be mounted to a gimbal frame 110 for the punching unit 102. The planar coordinate mechanism 155 can displace the piercing tool (e.g., tool 130) independently of the gimbal frame 110 in a direction parallel to axes Xo and Yo, thereby displacing the piercing tool (e.g., tool 130) relative to the metering disc. The planar coordinate positioning mechanism 155 can include first and second displacement mechanisms. The first displacement mechanism 151 can translate the piercing tool (e.g., tool 130) along the first platform axis Xo relative to the metering disc over a suitable distance. The second displacement mechanism 153 can translate the piercing tool (e.g., tool 130) along axis Yo relative to the metering disc over a suitable distance. The displacement mechanisms can be one or more suitable mechanisms, such as, for example, a stepper motor drive, a pneumatic or hydraulic actuator. Preferably, the distance along the axis Xo or Yo can be from about 1 to about 4 millimeters.

The gimbal frame or spherical coordinate positioning mechanism 110 can pivot the piercing tool (e.g., tool 130) relative to each of the first, second and third axes $Z_\varnothing$, $X_\varnothing$, and $Y_\varnothing$, with a first, second and third pivoting mechanisms. In particular, the punching unit 102 has a spherical or swivel bearing 112 that can be captured in the gimbal frame 110. The first pivoting mechanism 111 can rotate the piercing tool (e.g., tool 130) about the first spherical coordinate axis $Z_\varnothing$; the second pivoting mechanism 113 can rotate the piercing tool (e.g., tool 130) about the second spherical coordinate axis $X_\varnothing$; and the third pivoting mechanism 115 can rotate the piercing tool (e.g., tool 130) about the third spherical coordinate axis $Y_\varnothing$. Each of the pivoting mechanisms can be a suitable rotary actuator, such as, for example, hydraulic, pneumatic, or electromagnetic actuators. Preferably, each of the pivoting mechanisms includes an electronic encoder or scaling unit connected to the gimbal frame 110.

Figure 2:
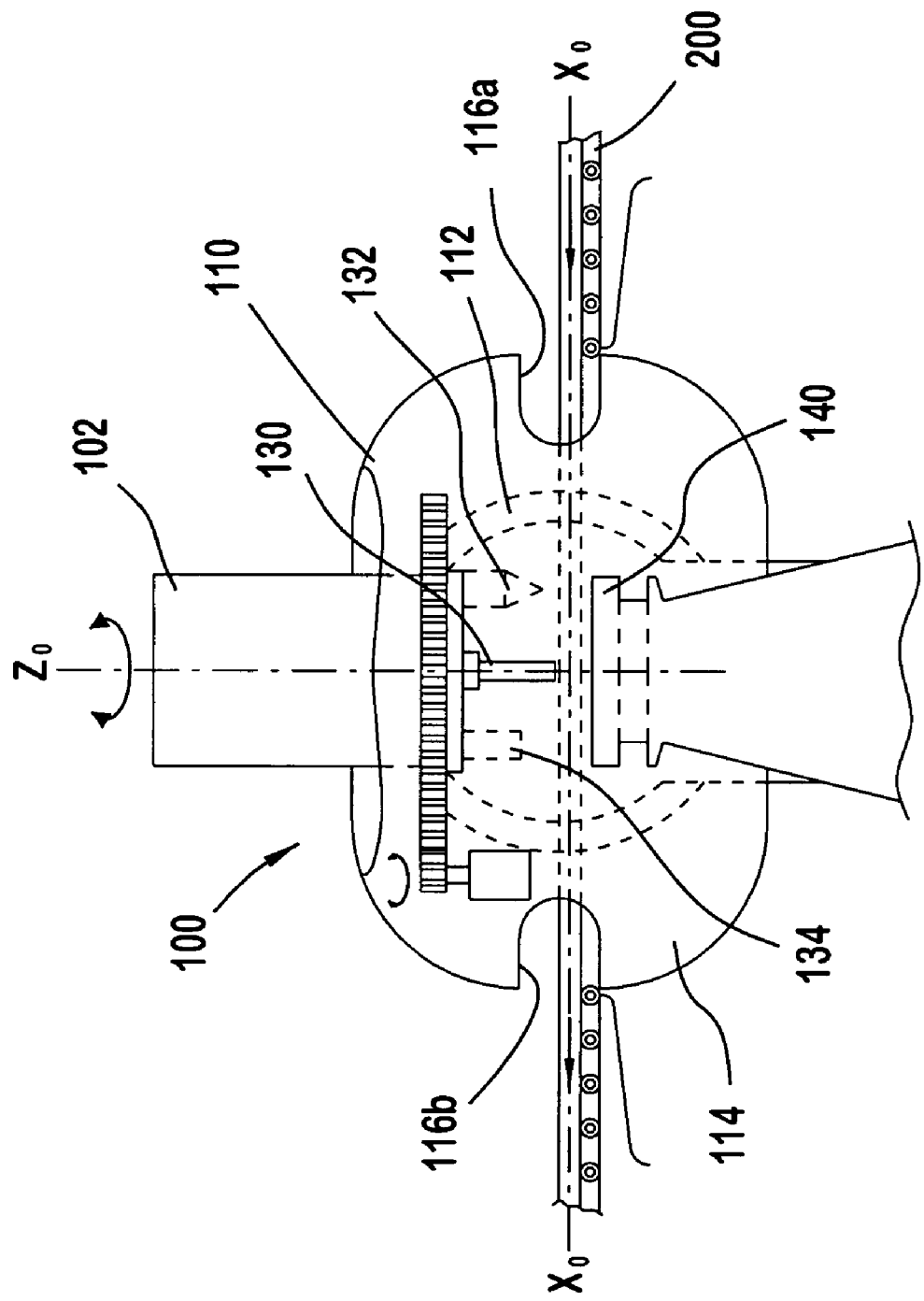
FIG. 2 is a cross-sectional view of a preferred embodiment of a self-contained tooling unit as viewed from one axis.

In a preferred embodiment, the gimbal frame 110 contains the swivel bearing 112. The gimbal frame 110 has first and second apertures 116a and 116b diametrically opposed thereon to allow entry and exit of the workpiece 300. As shown in FIG. 2, the workpiece 300 can be delivered by the transport apparatus 200 to the first aperture 116a so that the piercing tool (e.g., tool 130) can process the workpiece 300. Thereafter, the workpiece 300 can be transported out of the swivel bearing 112 through aperture 116c in the bearing 112 and then the workpiece 300 can move through the second aperture 116b in the gimbal frame 110. As shown in FIG. 1A, the apertures 116a and 116b are provided with sufficient clearance so that the platform 120 on which the swivel bearing 112 is mounted thereon can be adjusted.

In operation, strips of blank workpiece 300 are disposed on the transport mechanism 200. The tooling unit 102 can be indexed with respect to the strips of blank workpiece 300 on the transport mechanism. Each blank workpiece 300 can be referenced along axis Xo so that as the workpiece 300 is transported to the tooling unit 102 in step-wise fashion, the tooling unit 102 is able to process each workpiece 300 in a repeatable and accurate manner. In particular, each workpiece 300 can be generally positioned so that a referential center (e.g., a pilot aperture) of each workpiece 300 (as defined by Cartesian coordinates Xo, Yo) can be aligned with a reference cartesian coordinate position $X_1$, $Y_1$ of the tooling unit 102. As each workpiece 300 enters the tooling unit 102 through the first aperture, the reference point located by Cartesian coordinates $X_1$, $Y_1$, which is preferably the working tip of the piercing tool (e.g., tool 130), is also referenced with respect to the spherical coordinates $X_\varnothing$, $Y_\varnothing$, and $Z_\varnothing$. By referencing the working tip of the tool with the referential center of the workpiece, the tooling unit 102 is able to position the tip in virtually any orientation so that the working tip can perform a desired operation with respect to the referential center Xo, Yo of the workpiece 300.

Figure 4:
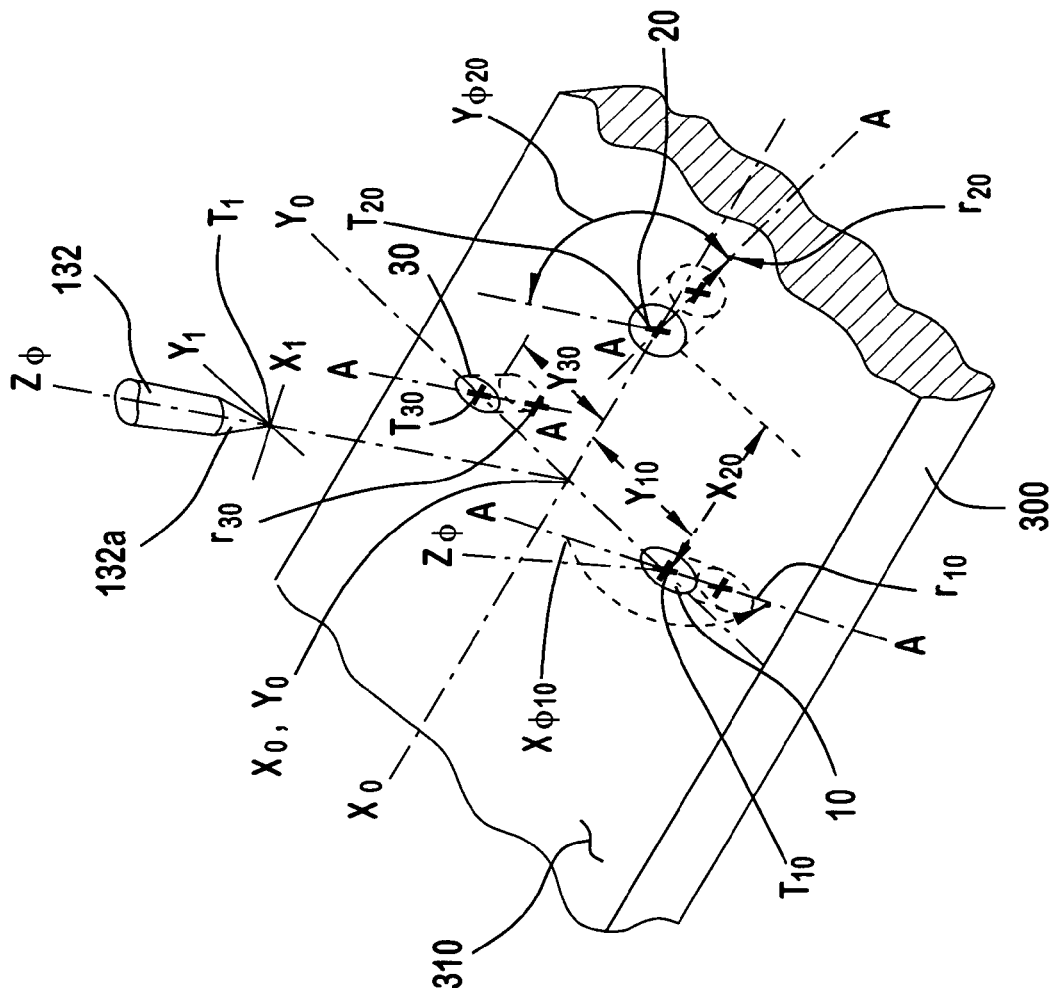
FIG. 4 illustrates pictorially a formation of orifices in a workpiece for the self-contained tooling unit of FIG. 1A.

Referring to FIGS. 2 and 4, a tip 132a of a punch tool 132 can be translated parallel to one of the axes $X_1$, $Y_1$ relative to the first and second plate axes Xo and Yo. The tip 132a can be located initially at position $T_1$ defined by $X_1$, $Y_1$ relative to the center Xo, Yo. Once the tip 132a of the piercing tool can be translated and/or rotated to a desired position relative to the referential center Xo, Yo, the tool 132 can penetrate the workpiece 300 by translating the tip 132a along the tool axis A-A. Alternatively, the piercing tool (e.g., tool 130), and hence the tool axis A-A, can be pivoted relative to at least one of the first, second and third plate axes $X_\varnothing$, $Y_\varnothing$, and $Z_\varnothing$ prior to being translated or vice versa. Thereafter, the tip 132a of the piercing tool (e.g., tool 130) can penetrate the workpiece 300 by displacing the piercing tool (e.g., tool 130) along the tool axis A-A, which is translated and rotated with respect to, for example, Xo or Yo along the spherical coordinates $X_\varnothing$, $Y_\varnothing$, and $Z_\varnothing$. In penetrating the workpiece 300, the piercing tool (e.g., tool 130) can perform at least one of the following processes: punching, drilling, shaving, and coining in the self-contained unit.

Three examples of the orifices formed by the piercing tool are shown in FIG. 4. A first orifice 10 can be formed by translating the tool 132 from a starting position $T_1$ over axis Yo by a distance $Y_{10}$ and pivoting the tool axis A-A about spherical coordinate $X_\varnothing$ over an angle $X_{\varnothing 10}$ so that an angled orifice (i.e., an orifice whose wall is not perpendicular to the first surface 310) can be formed therein when the tool 132 is displaced along the tool axis A-A over distance $r_{10}$. The location of the tip 132a of the tool 132 at this position $T_{10}$ is defined by a combination of cartesian and spherical coordinates ($X_\varnothing$, $Y_{10}$) and ($X_{\varnothing 10}$, $r_{10}$), respectively. The orifice 10 can be formed by translating the tip 132a at its position as defined by the cartesian along distance $r_{10}$ into the surface 310 so that the orifice 10 is formed with its wall oblique to the surface 310.

A second orifice 20 can be formed by translating the tool 132 over a distance $X_{20}$ from the position $T_1$ and rotating the tool unit about axis $Y_\varnothing$ for a desired angle $Y_{\varnothing 20}$ such that the cartesian coordinates of the tip 132 become ($X_{20}$, Yo) and the spherical coordinates become ($Y_{\varnothing 20}$, $r_{20}$). In this spatial orientation, the tool 132 can be displaced along the distance $r_{20}$ so that the tip 132a penetrates the surface 310 along tool axis A-A and forms an angled orifice 20.

A third orifice 30 can be formed by translating the tool 132 from the position $T_1$ to position $T_{30}$ over distance $Y_{30}$. In this instance, the orifice 30 being formed can be a straight orifice or one in which the wall of the orifice can be generally perpendicular to the surface 310. Hence, the Cartesian coordinates of the tip 132 are ($X_o$, $Y_{30}$) and its spherical coordinates are ($Z_\varnothing$, $r_{30}$) so that as the tip 132 is displaced along the distance $r_{30}$ relative to axis $Z_\varnothing$, a straight orifice 30 can be formed. Preferably, each of the metering orifices can be formed by a punch tool with a generally circular cross-section about tool axis A-A with a diameter from about 50 to about 400 microns as measured generally transverse to the tool axis A-A.

Although only tool 132 has been described in detail, it should be noted that the punching unit 102 can be configured to use different types of tool as needed, with preferably one tool at a time being utilized with the module 102. For example, as shown in FIG. 2, the tooling unit can include a shave punch, asymmetric punch, and any other suitable tools. Each of the tools can be configured so that its working end can be oriented with respect to any desired referential datum on the workpiece 300.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

I claim:

1. An apparatus for forming a metering disc of a fuel injector from a workpiece, the metering disc including first and second surfaces extending substantially parallel to a base plane along at least first and second platform axes, the first and second surfaces being spaced along a third platform axis extending orthogonally with respect to the base plane, the apparatus comprising:
   a piercing tool extending along a tool axis, the piercing tool adapted to penetrate the workpiece;
   a planar coordinate positioning mechanism displacing the piercing tool parallel to at least the first platform axis relative to the workpiece; and
   a spherical coordinate positioning mechanism pivoting the tool axis relative to first, second and third axes so that a tip of the piercing tool is located on the base plane, the spherical coordinate positioning mechanism including a frame having an interior, a spherical bearing, having a generally spherical periphery, being received in a cooperating manner in the interior of the frame,
   wherein the spherical bearing and the frame have cooperating apertures therein such that the workpiece can pass there-through.

2. The apparatus according to claim 1, wherein the piercing tool comprises at least one of a punching unit, a drilling unit, a shaving unit, a dimpling, and a coining unit.

3. The apparatus according to claim 1, wherein the planar coordinate positioning comprises:
   a first displacement mechanism translating the piercing tool along the first platform axis relative to a defined position on the workpiece; and
   a second displacement mechanism translating the piercing tool along the second platform axis relative to the defined position on the workpiece.

4. The apparatus according to claim 3, wherein the spherical coordinate positioning mechanism comprises:
   a first pivoting mechanism rotating the piercing tool about the first axis;
   a second pivoting mechanism rotating the piercing tool about the second axis; and a third pivoting mechanism rotating the piercing tool about the third axis.

5. The apparatus according to claim 4, wherein the planar coordinate positioning mechanism displaces the spherical bearing along at least one of the first or second platform axes.

6. The apparatus according to claim 1, wherein the apertures extends parallel to the first or second axes.

* * * * *